May 19, 1925.                J. GULLONG                1,538,320
PLATE LOCK
Filed June 6, 1924

INVENTOR
J. Gullong
BY
ATTORNEYS

Patented May 19, 1925.

1,538,320

UNITED STATES PATENT OFFICE.

JACOB GULLONG, OF CHICAGO, ILLINOIS.

PLATE LOCK.

Application filed June 6, 1924. Serial No. 718,342.

*To all whom it may concern:*

Be it known that I, JACOB GULLONG, a citizen of the United States, and a resident of Chicago, county of Cook, State of Illinois, have invented a new and useful Improvement in Plate Locks, of which the following is a full, clear, and exact description.

My invention relates to improvements in plate locks, and more particularly to that type of lock for the securing of a name plate to the radiator of a motor vehicle, and it consists in the combinations, constructions, and arrangements herein described and claimed.

An object of my invention is to provide a plate lock of the type described by means of which a plate bearing the emblem, crest, or trade-mark of a motor vehicle may be permanently fixed to the radiator of a motor vehicle without the employment of special tools for the purpose, and which may be so fixed in but a few seconds, thereby greatly facilitating this operation in the construction of a motor vehicle, which at the present time necessitates a process including turning over portions of the plate.

A further object of my invention is to provide a device of the type described which is automatically adjustable for radiator shells of various thicknesses, and which at all times maintains the plate in extremely close engagement with the radiator shaft, thereby preventing unintentional movement of the plate relative to the shell.

A further object of my invention is to provide a plate lock of the type described by means of which a plate may be fixed to the radiator shell of a motor vehicle in which the apertures provided through the shells are of slightly varying diameters. This feature of my invention I deem a most important one, since there is to be expected slight variations in the diameters of the apertures in various makes of vehicles.

A further object of my invention is to provide a device of the type described that is extremely simple in construction, that is durable, efficient in operation, and thoroughly practical for the purposes intended.

Other objects and advantages will appear in the following specification, and the novel features of the invention will be particularly pointed out in the appended claims.

My invention is illustrated in the accompanying drawings, forming part of this application, in which—

Figure 1:
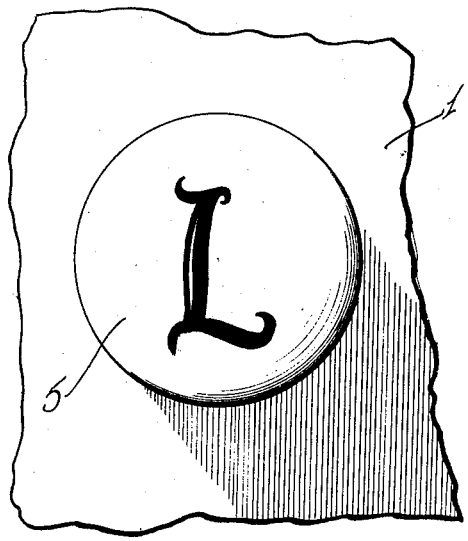
Figure 1 is a front elevation of an embodiment of my invention.

In carrying out my invention I make use of the ordinary type of radiator having a shell, a portion of which is shown at 1 in Figure 1. The radiator shell 1 is provided with an aperture 2 therethrough, usually at the upper mid portion of the shell, for the support of a plate bearing the emblem, crest, or trade-mark of the vehicle. At the present time such plates are fixed to the radiator by projecting a portion of the member spot welded or soldered to the plate through the aperture 2, in subsequently turning over or riveting back a part of this member so that it will draw the plate into close engagement with the shell. This means for fixing the plate is one which necessitates skill as well as time of a skilled mechanic, and the fixing of the plate to the vehicle becomes an important item in the manufacture of the vehicle.

Figure 3:
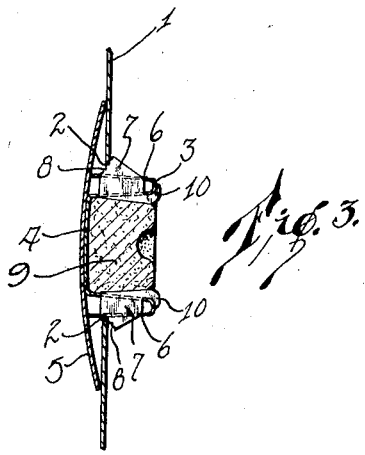
Figure 3 is a sectional view along the line 3—3 of Figure 2.

My improved means for affixing the plate consists in the provision of a cup-shaped member 3, staggered or spot welded at 4 to a plate such as shown at 5, (see Figure 3). The side walls of the cup-shaped member 3 are substantially U-shaped, the outermost portion 6 thereof being tapered outwardly toward the plate 5 that is at its outermost portion.

A pair of cam members 7 are projected through opposite portions of the double side walls of the cup-shaped member 3 in the manner shown in Figure 3, there being aligned slots through the wall portions for the projection of the cam members therethrough.

That portion of the cam members adjacent to the plate 5 is serrated as shown at 8, so that movement outwardly of the cam 7 as by the provision of a resilient rubber plug 9 placed within the cup-shaped member 3, will cause the serrated portions 8 of the cams 7 to engage with the rearmost portion of the radiator shell 1, surrounding the aperture 2, when the cup-shaped member is in the position shown in Figure 3.

The peculiar structure of the upper ends of the cams 7, which includes a hook-shaped portion 10, provides proper fulcrum for the cam 7 relative to the walls of the cup-shaped member 3.

Figure 2:
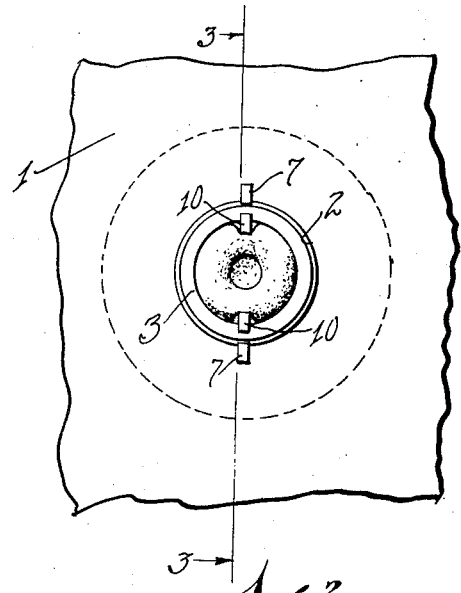
Figure 2 is a rear elevation of the mechanism illustrated in Figure 1.

From the foregoing description of the various parts of the device, the operation thereof may be readily understood. In applying a plate such as the plate 5, to the shell of the motor vehicle, the entire device is assembled as shown in Figures 2 and 3. The device is then held in the hand and the cup-shaped member 3 forced through the opening 2. As the side walls of the opening 2 engage with the inclined surface of the cams 7, the cams will be forced inwardly against the force of the resilient plug 9, thus permitting the movement of the cup-shaped member to the exact position shown in Figure 3, whereupon the cams 7 are free to move outwardly and the serrated portion 8 thereof will engage the adjacent parts of the radiator shell.

Any vibration or further movement of the plate 5 will only tend to more closely seat the plate upon the shell, so that the plate is firmly and permanently secured to the shell.

Figure 4:
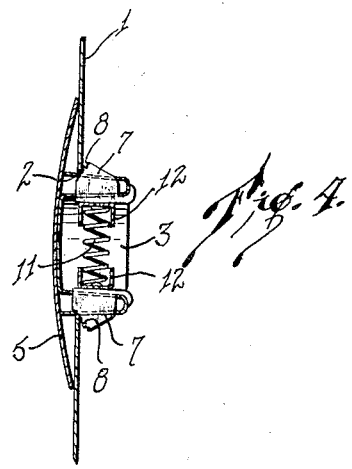
Figure 4 is a sectional view through a modified form of my invention.

In Figure 4 I have shown a modified form of my invention, in which I employ a compression spring 11 in place of the resilient plug 9. The spring 11 is provided with a pair of cup-shaped members 12 at each end thereof, so as to insure engagement of the cams with the adjacent ends of the spring.

I claim:

1. A plate lock comprising a tubular member fixed to the plate and arranged for partial projection through an aperture provided in a supporting surface upon which said plate is to be fixed, and means carried by said tubular member for engaging with said supporting surface adjacent to said aperture at the rear wall thereof, thereby locking said plate upon said supporting surface, said means including diametrically opposed cam members, and resilient means for yieldably forcing said cam members outwardly from said tubular member.

2. A plate lock comprising a tubular member fixed to the plate and arranged for partial projection through an aperture provided in a supporting surface upon which said plate is to be fixed, and means carried by said tubular member for engaging with said supporting surface adjacent to said aperture at the rear wall thereof, thereby locking said plate upon said supporting surface, said tubular member having its outer walls tapering so as to assure close engagement with apertures through said supporting surface of slightly varying diameters.

3. A plate lock of the type described comprising a tubular member fixed to said plate and arranged for projection through an aperture provided in a supporting surface upon which said plate is to be fixed, a pair of diametrically opposed cam members carried by said tubular member and arranged for movement outwardly from said tubular members, whereby said cam members may engage with the rearward surface of said supporting surface adjacent to said aperture, and resilient means disposed within said tubular member and arranged to bear upon the innermost and adjacent portions of said cams.

JACOB GULLONG.